(12) United States Patent
Chang

(10) Patent No.: US 9,898,770 B2
(45) Date of Patent: Feb. 20, 2018

(54) METHOD AND APPARATUS TO VISUALIZE LOCATIONS OF RADIO FREQUENCY IDENTIFICATION (RFID) TAGGED ITEMS

(71) Applicant: AT&T Intellectual Property I, L.P., Atlanta, GA (US)

(72) Inventor: Wayne Chang, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/168,559

(22) Filed: May 31, 2016

(65) Prior Publication Data

US 2016/0275586 A1 Sep. 22, 2016

Related U.S. Application Data

(63) Continuation of application No. 14/635,802, filed on Mar. 2, 2015, now Pat. No. 9,411,996, which is a continuation of application No. 14/059,249, filed on Oct. 21, 2013, now Pat. No. 8,970,379, which is a continuation of application No. 13/567,917, filed on Aug. 6, 2012, now Pat. No. 8,564,441, which is a continuation of application No. 13/186,269, filed on Jul. 19, 2011, now Pat. No. 8,237,564, which is a
(Continued)

(51) Int. Cl.
*H04Q 5/22* (2006.01)
*G06Q 30/06* (2012.01)
*G01S 3/04* (2006.01)
*G02B 27/01* (2006.01)
*G06K 7/10* (2006.01)

(52) U.S. Cl.
CPC .......... *G06Q 30/0623* (2013.01); *G01S 3/043* (2013.01); *G01S 3/046* (2013.01); *G02B 27/017* (2013.01); *G06K 7/10366* (2013.01); *G06K 7/10376* (2013.01); *G02B 2027/014* (2013.01); *G02B 2027/0138* (2013.01)

(58) Field of Classification Search
CPC ............ G01S 5/025; H04Q 5/22; H04W 4/02
USPC .......................... 340/10.6, 572.1, 572.4, 8.1
See application file for complete search history.

(56) References Cited

U.S. PATENT DOCUMENTS 5,565,858 A 10/1996 Guthrie
5,920,194 A 7/1999 Lewis et al.
(Continued)

OTHER PUBLICATIONS

International Search Report and Written Opinion, issued by the International Searching Authority in connection with International Application No. PCT/US2008/051147, dated May 23, 2008, 12 pages.
(Continued)

*Primary Examiner* — Toan N Pham

(57) ABSTRACT

Methods and apparatus to visualize locations of radio frequency identification (RFID) tagged items are described. One example method includes receiving a request from a portable electronic device to access product information associated with an individual radio frequency identification (RFID) tagged item, determining a location of the product information in a database, transmitting the located product information to the portable electronic device for display thereon, receiving modified product information associated with the individual RFID tagged item from the portable electronic device, and storing the modified product information to the location of the product information in the database.

20 Claims, 5 Drawing Sheets

Related U.S. Application Data continuation of application No. 12/603,365, filed on Oct. 21, 2009, now Pat. No. 7,986,239, which is a continuation of application No. 11/673,829, filed on Feb. 12, 2007, now Pat. No. 7,639,138.

(56) References Cited

U.S. PATENT DOCUMENTS

| | | | |
|---|---|---|---|
| 6,650,225 | B2 | 11/2003 | Bastian, II et al. |
| 7,005,968 | B1 | 2/2006 | Bridgelall |
| 7,044,373 | B1 | 5/2006 | Garber et al. |
| 7,063,256 | B2 | 6/2006 | Anderson et al. |
| 7,142,120 | B2 | 11/2006 | Charych et al. |
| 7,295,114 | B1 * | 11/2007 | Drzaic .................. A62B 99/00 235/385 |
| 7,295,132 | B2 * | 11/2007 | Steiner .................... G01C 3/26 235/383 |
| 7,362,219 | B2 | 4/2008 | Nogami et al. |
| 7,639,138 | B2 | 12/2009 | Chang |
| 7,986,239 | B2 | 7/2011 | Chang |
| 8,237,564 | B2 | 8/2012 | Chang |
| 8,564,441 | B2 | 10/2013 | Chang |
| 9,594,991 | B2 * | 3/2017 | Luetzelberger .... G06K 7/10079 |
| 2003/0141962 | A1 | 7/2003 | Barink |
| 2003/0214387 | A1 | 11/2003 | Giaccherini |
| 2004/0176143 | A1 | 9/2004 | Willins et al. |
| 2004/0182925 | A1 | 9/2004 | Anderson et al. |
| 2004/0233065 | A1 | 11/2004 | Freeman |
| 2005/0065861 | A1 | 3/2005 | Bann |
| 2005/0137943 | A1 | 6/2005 | Holzman |
| 2005/0212660 | A1 | 9/2005 | Hansen et al. |
| 2005/0212676 | A1 | 9/2005 | Steinberg et al. |
| 2005/0229227 | A1 | 10/2005 | Rogers |
| 2005/0246094 | A1 | 12/2005 | Moscatiello |
| 2006/0022814 | A1 | 2/2006 | Nogami et al. |
| 2006/0092072 | A1 | 5/2006 | Steiner |
| 2006/0244677 | A1 | 11/2006 | Dempski |

OTHER PUBLICATIONS

Office Action, Issued by the United States Patent and Trademark Office dated Mar. 31, 2009, in connection with U.S. Appl. No. 11/673,829, 9 pages.

Notice of Allowance and Fee(s) Due, issued by the United States Patent and Trademark Office dated Sep. 17, 2009, in connection with U.S. Appl. No. 11/673,829, 4 pages.

* cited by examiner

METHOD AND APPARATUS TO VISUALIZE LOCATIONS OF RADIO FREQUENCY IDENTIFICATION (RFID) TAGGED ITEMS

This application is a continuation of U.S. patent application Ser. No. 14/635,802, filed Mar. 2, 2015, now U.S. Pat. No. 9,411,996, which is a continuation of U.S. patent application Ser. No. 14/059,249, filed Oct. 21, 2013, now U.S. Pat. No. 8,970,379, which is a continuation of U.S. patent application Ser. No. 13/567,917, filed Aug. 6, 2012, now U.S. Pat. No. 8,564,441, which is a continuation of U.S. patent application Ser. No. 13/186,269, filed Jul. 19, 2011, now U.S. Pat. No. 8,237,564, which is a continuation of U.S. patent application Ser. No. 12/603,365, filed Oct. 21, 2009, now U.S. Pat. No. 7,986,239, which is a continuation of U.S. patent application Ser. No. 11/673,829, filed Feb. 12, 2007, now U.S. Pat. No. 7,639,138. All of the above-referenced applications are herein incorporated by reference in their entirety.

FIELD OF THE INVENTION

This disclosure relates generally to radio frequency identification (RFID) systems and, more particularly, to methods and apparatus to visualize locations of RFID tagged items.

BACKGROUND

Radio frequency identification (RFID) technology is used to track large quantities of products. An RFID system typically includes an RFID tag that is secured to an object and is interrogated by a scanner, or reader, configured with a transceiver. The transceiver transmits electromagnetic waves that are received by an antenna and a microchip embedded on the RFID tag. The microchip includes an embedded code, or identification (ID), and is activated by the electronmagnetic waves and outputs electromagnetic waves at another frequency to send a return signal to the transceiver. The return signal in the electromagnetic waves includes a copy of the code embedded in the microchip. The transceiver converts the received waves from RFID tags into digital data representative of the codes embedded in each RFID tag corresponding to a received wave. The digital data is analyzed to distinguish RFID tags from one another when multiple tags are scanned due to the embedded codes in the tags and their associated signals.

RFID systems can use different types of RFID tags. The two common types are passive and active RFID tags. A passive RFID tag draws power from the electromagnetic energy provided by the transceiver to power the microchip's circuits. On the other hand, active RFID tags have an internal energy source (e.g., a battery) that powers the microchip inside the tag. Active RFID tags are typically more expensive than their passive counterparts; however, active RFID tags have a much greater read range than passive tags. That is, active RFID tags may be read at greater distances from the transceiver than may be passive RFID tags. Typically, the application of the RFID system dictates whether an active or a passive tag should be used in the system.

Frequently, RFID tagged items are misplaced or data regarding the location of a product associated with a particular RFID tag is not sufficiently precise to facilitate easy product location and identification in a storage area. When this occurs, time is wasted searching for a particular item or product unit. More specifically, the general location of a product is known via the RFID transceiver, but the precise physical location of the product is difficult to determine.

DETAILED DESCRIPTION

The example system discussed herein expands current RFID technology. The described RFID system increases the accuracy and ease of locating RFID tagged items and combines visual information to provide a user with a visual representation of located products items and/or information associated with the RFID tagged items. In one example, the location of the RFID tag is determined at a portable electronic device by calculating a distance and lateral position by processing RF waves and, in one particular example, the angles at which the RF waves are received. In additional examples, the system includes a portable electronic device, such as, for example, a pair of goggles or a handheld device, including a transparent display to view the RFID item. The transparent display allows the user to view the background area surrounding the item while viewing product information associated with an RFID tagged item, wherein the associated information is retrieved from a database having entries associated with the code stored in an RFID tag.

The portable electronic device is also configured with a communication channel to transfer information to and receive information from the database. The product information from the database and the information associated with the location of RFID tagged item will be processed such that the portable electronic device will display, to a user, a superimposed image of the product information over the background area. Thus, a user may view product information as being superimposed over view of the tagged item.

Figure 1:
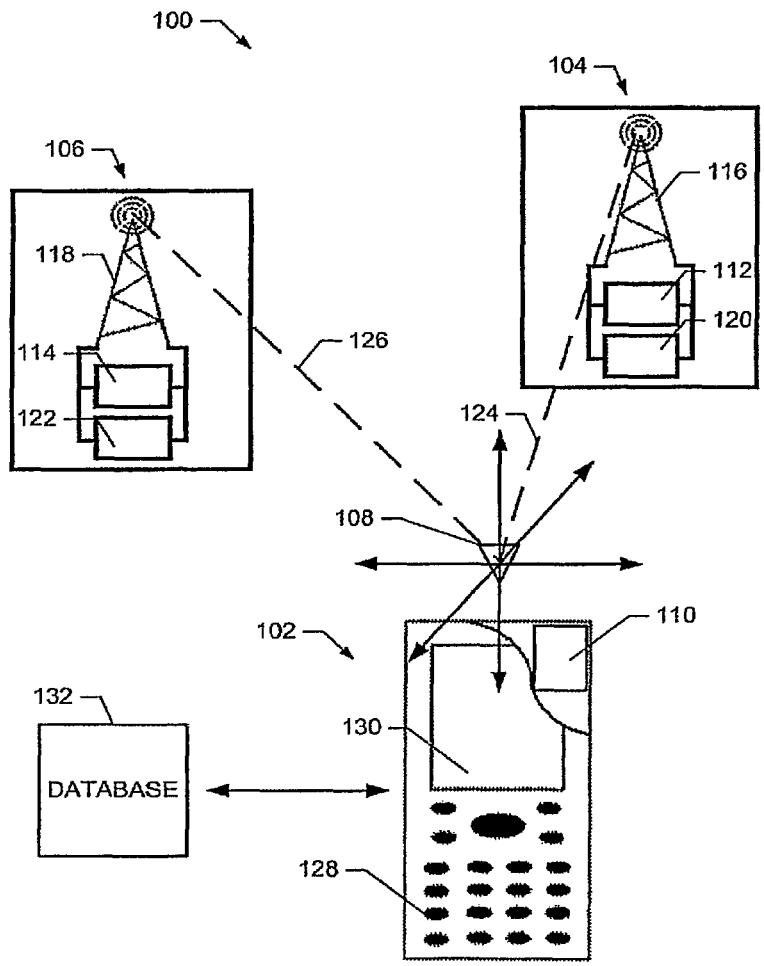
FIG. 1 is a diagram of an example RFID system including an example portable electronic device to read received RF wave angles from RFID tags.

FIG. 1 is a diagram of an example RFID system 100 including an example portable electronic device 102 to read received RF wave angles from RFID tags, two of which are generally referred to using reference numerals 104 and 106. The example portable electronic device 102 includes an antenna 108 to send signals to and receive signals from RFID tags 104 and 106. The portable electronic device 102 includes an internal transceiver 110 to locate RFID tags 104 and 106. In one example, the RFID tags 104 and 106 each contain an integrated circuit 112 and 114 that is coupled with an antenna 116 and 118 to transmit data. The RFID tags 104 and 106 also contain memory 120 and 122 that stores information associated with an identification code and other data to be transmitted when the RFID device is activated or interrogated using electromagnetic energy 124 and 126 from the portable electronic device 102.

In the example of FIG. 1, the portable electronic device 102 includes the antenna 108, the transceiver 110, a keypad 128, and a display screen 130. The keypad 128 enables a user to input or select a RFID tag when performing search for a particular item. In addition, the keypad 128 is configured to allow the user to filter-out or select multiple RFID tags 104 and 106, and is further configured to enable the user to update or modify information associated with individual RFID tags stored on a database 132.

The database 132 may store any number of different pieces of information. For example, the database 132 may store a listing of RFID tag identifiers, along with product information to which the RFID tag identifiers correspond. The database 132 may store information such as product descriptions, available quantities, manufacturer names, model numbers, catalog numbers, price, or any other type of information that may be tied to the RFID tag identifier.

When the portable electronic device 102 is first initiated, the user may input information corresponding with a particular RFID tag. For example, the user can input a product name, part number, RFID address, etc. using the keypad 128. The keypad 128 enables the user to enter multiple search criteria to limit the search. With the search criteria in place, the portable electronic device 102 scans an area based on the search criteria. Once the portable electronic device 102 receives responses from local RFID tags 104 and 106 via an antenna 108, the user may select individual tags or filter out multiple tags related to products shown within the display screen 130. This will isolate the individual product items that are relevant to the search. Furthermore, as each item is found, the user may update information on the database 132 by keying-in information associated with a particular tagged item on the keypad 128.

As shown in the example of FIG. 1, the electronic device 102 includes the antenna 108 and the transceiver 110 to transmit and receives electromagnetic energy 124 and 126 to communicate with RFID tags 104 and 106. When electromagnetic energy 124 and 126 couples with the antennas 116 and 118 on RFID tags 104 and 106, the microchips 112 and 114 modulate the electromagnetic waves 124 and 126 and the tag (e.g., the tag 104 and/or 106) transmits a return signal to the device 102. The returned electromagnetic energy 124 or 126 can contain information, such as the identification number, product information, or any other data stored on the memory 120 or 122 of the RFID tag 104 and/or 106.

The portable electronic device 102 receives the returned electromagnetic energy 124 or 126 from the RFID tags 104 and 106 and converts the received waves into digital data. In an example, the digital data is processed to determine the location of the tagged items using the wave angles received on the antenna 108. Theses wave angles will be used to determine the distance and lateral position of the RFID tags 104 and 106. Additionally, the received waves are analyzed to extract the identification number from an RFID tag. Other wave characteristics such as time delay, amplitude change, and other characteristics may also be calculated to verify the location of the RFID tags 104 and 106. The information obtained in processing the received waves will be configured for display 130 on the portable electronic device 102. The display or screen 130 is configured to display the location of the processed wave angles that visually represent the location of RFID tags 104 and 106, as well as product information to a user, discussed further in conjunction with FIG. 2.

Figure 2:
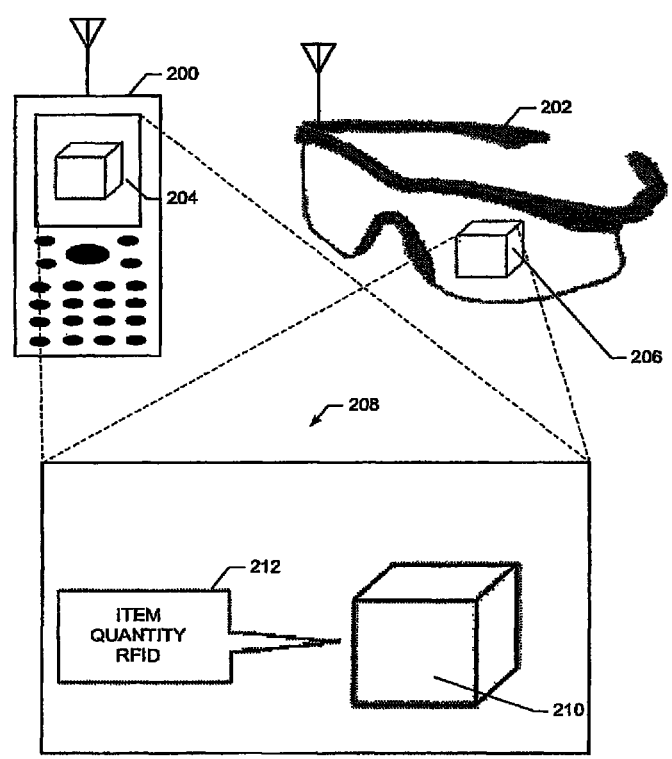
FIG. 2 is a diagram showing examples of portable electronic devices capable of being used in the example RFID system of FIG. 1.

FIG. 2 is a diagram showing examples of portable electronic devices capable of being used in an RFID system, such as the RFID system 100 of FIG. 1. The examples depicted in FIG. 2, are configured with a substantially transparent display to show the information associated with the RFID tag superimposed over the background including a product having an RFID tag being scanned. A first example includes a hand held device 200. During use, a user can hold the device 200 at eye level or within the line of sight of the viewer and see through substantially transparent display, for example, RFID tagged items stored on shelves. While viewing RFID tagged items through the substantially transparent display, the hand held device 200 scans for RFID tags that are within the field of view of the substantially transparent display. When RFID tags are found, the hand held device 200 retrieves information associated with the RFID tagged items and displays such information on the substantially transparent display. The information associated with the RFID tagged items may be displayed on the substantially transparent display in proximity 10 the RFID tagged items such that a user can view the product storage areas and information may be superimposed over the view of the storage area in such a way that identification of certain items in view is presented. The identification may include additional information related to the tagged product such as manufacturer, model number, quantity, price, etc.

Another example form factor for a portable electronic device 102 may be a headset or a pair of goggles 202. Of course, other form factors of portable electronic devices may be provided. In any case, an overlaying image, also known as a heads-up display (HUD) enables a user to precisely locate a RFID tagged item and provides opportunity to present additional information associated with the RFID tagged item.

A HUD is any type of display that presents data without blocking the user's view. This technique was pioneered for military aviation and is now used in commercial aviation, motor vehicles, and other applications. The HUD can be integrated into glasses or goggles 202 or can be a stand alone screen, in which the display element moves with the user's head. Such an arrangement is based on a monitoring of the user's direction of sight and a determination of the appropriate image to be presented. That is, the portable electronic device 102 monitors the direction a user is looking and determines the RFID tag information to be displayed and the position in which it is to be displayed. Such an arrangement enables a user to be presented with additional information on a display screen in a position related to the location that the RFID tagged item is seen in the display screen 204 or 206.

HUDs include a display element 204 and 206 which is largely transparent, meaning the information is displayed in contrasting superposition over the user's unobstructed view. A common technique by which current HUDs are implemented is to project an image onto a clear glass optical element called a combiner. Current display technologies that have been demonstrated include, liquid crystal (LC), liquid crystal on silicon (LCoS), digital micro-mirrors (DMDs), organic light-emitting diode (OLED) and lasers. As shown in FIG. 2, the display 204 and 206 depicts an image of an item 210. An enlarged view of the display 208 shows the item 210 and the information associated with the item on a label 212. The label 212 can include an RFID number, product information, or any other information associated with the item 210. The label 212 may be an on-screen graphic or any other suitable video overlay.

Although the foregoing has described portable electronic devices as including transparent displays enabling information related to RFID tagged items to be displayed in proximity to where those items are viewed through the display, this is not necessarily the case. For example, a portable electronic device could use a conventional display screen such as a liquid crystal display (LCD) or any other display screen technology in conjunction with a video capture device, such as a miniature video camera or the like. In such an arrangement, a user points the portable electronic device toward an area to be viewed and the camera captures images that are displayed on the display screen. The portable electronic device detects the RFID tags associated with items on the displayed image and presents such information to the user by inserting the information on the display screen in proximity to the RFID items presented on the video display.

Figure 3:
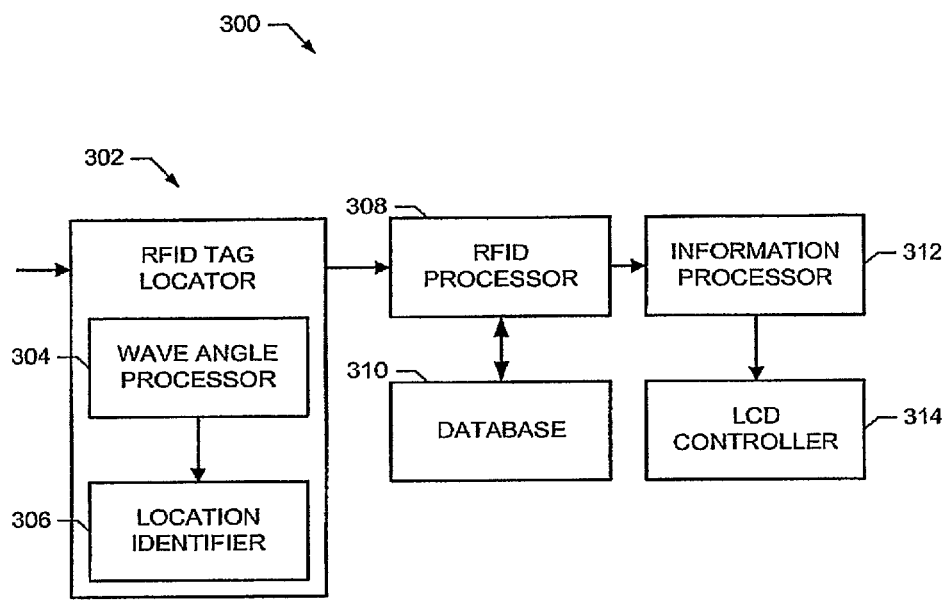
FIG. 3 is a block diagram representative of an example system for locating RFID tagged items, such as may be implemented using the example portable electronic devices of FIGS. 1 and 2.

FIG. 3 is a block diagram representative of an example system 300 for locating RFID tagged items, which may be used in any of the portable electronic devices shown in FIGS. 1 and 2. Turning to FIG. 3, an RFID locator 302 receives from one or more RFID tagged items to be processed an input or electromagnetic energy via an antenna. A wave angle processor 304 operates on the received electromagnetic energy to perform calculations associated with the received electromagnetic energy waves. The location identifier 306, using the calculations from wave angle processor 304, determines the distance and lateral position of each input to the RFID tag locator 302.

In one example, after a reader has completed a scan for RFID tags, within proximity of the reader, an index is generated with an entry for each tag containing the received wave angles. In addition to the RFID tagged item in question, the wave angle processor 304 may analyze the received waves from one or more adjacent tags in order to compare or reference multiple wave angles. This additional wave information may be used by the location identifier 306 to triangulate the position or location of an individual RFID tag, using multiple received waves as established reference points.

Furthermore, the input or electromagnetic energy associated with an RFID tag will be used by the RFID processor 308 to obtain the identification number of an RFID tag. The identification number determined by the RFID processor 308 may then be sent (e.g., via communication channel) to a database 310. The information generated at the RFID processor 308 can be used to reference information stored in the database 310, and the information may also be updated each time an RFID identification number is referenced. Additionally, the database 310 may be configured to be networked to the portable unit via, for example, the Internet. A central database may be accessed by various branches of a distribution system, thereby providing not only information related to product on hand, but providing information regarding product availability within a network. Once the information is referenced from the database 310, it is sent back through the communication channel to the RFID processor 308 so that it can be further processed for display.

The information generated by the RFID tag locator 302 and the RFID processor 308 are then sent to an information processor 312. The information associated with the location of the calculated RF waves, the reference from the RFID tag, and the data from the database 310 are combined by the information processor 312 and configured for display to a user by an LCD controller 314. The LCD controller 314 is configured to present the information associated with the RFID tag on screen for HUD.

Figure 4:
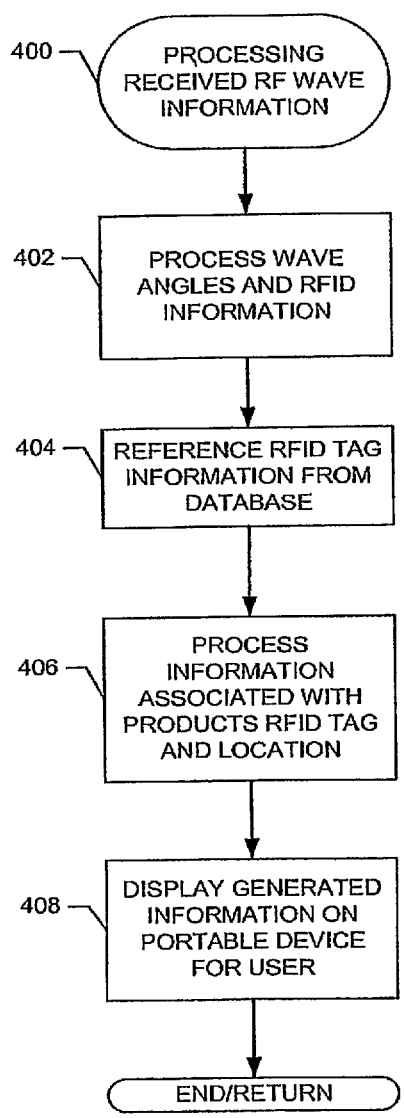
FIG. 4 is a flowchart representative of an example method of processing the received information to overlay information associated with an RFID tagged item on an image.

FIG. 4 is a flowchart representative of an example process 400 of processing the received information to overlay the RFID tag information on an image. FIG. 4 represents example processes that may be implemented using hardware and/or machine readable instructions comprising a program for execution by a processor (e.g., the processor 502 shown in the example processor system 500 of FIG. 5). Such program(s) may be embodied in software stored on a tangible medium such as a CD-ROM, a floppy disk, a hard drive, a digital versatile disk (DVD), or a memory associated with the processor 502 and/or embodied in firmware and/or dedicated hardware in a well-known manner. For example, the process of FIG. 4 may be implemented using any form of logic, digital or otherwise. Additionally, some aspects of the process 400 may be carried out manually. Further, although the example processes are described with reference to the flowchart illustrated in FIG. 4, persons of ordinary skill in the art will readily appreciate that many other methods of implementing the example methods may alternatively be used. For example, the order of execution of the blocks may be changed, and/or some of the blocks described may be changed, eliminated, or combined. Further, some or all of the blocks may be performed manually.

As shown in FIG. 4, the location of the RFID tagged item will be determined by processing the characteristics of the returned electrometric energy from the RFID tagged items. The circuitry of the RFID tag returns an electromagnetic signal back to the transceiver of the electronic device. The return RF waves are received and are processed to determine the location of the RFID tag, including wave characteristics (i.e., wave angles) extracted from each received wave (block 402). In addition, the identification number assigned to an RFID tag is obtained and sent to a database as a reference (block 404). The database will update the information associated with each product (e.g., location, quantity, reference number, etc.). The database may provide additional information related to the tagged items and that such information may be retrieved and presented for display. In addition, the database may be configured to be networked via, for example, the Internet or to a central database to be accessed by various branches of a distribution system. In this manner, any additional RFID tag information stored may be processed in association with the data stored on the database (block 404).

As shown in FIG. 2, the information presented to a user may be configured to include the data from the processed wave angles, the RFID identification, and the referenced information from the database. Turning to FIG. 4, additional processing is required so that each identified tag corresponds to the established location, and displayed with the location is the information from the identification number and the database (block 406). This processed information continuously updates with new information as each scan locates additional RFID tags. The processed information associated with an RFID tagged item is then displayed on the portable electronic device to a user (block 408).

Figure 5:
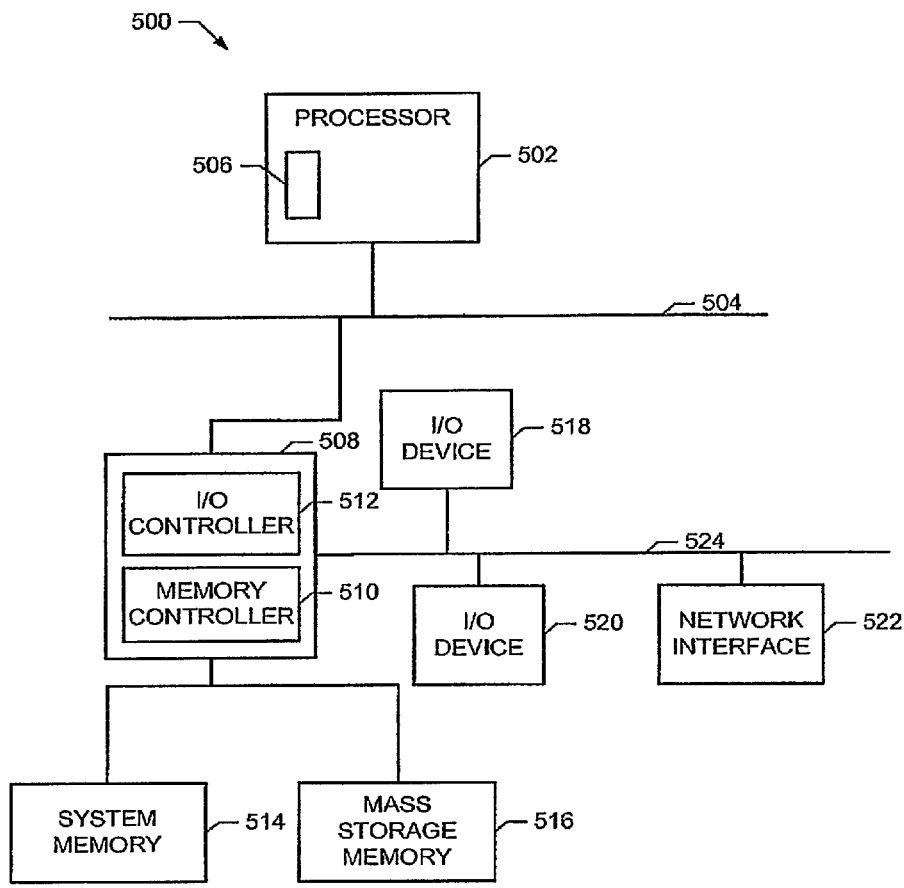
FIG. 5 is a block diagram of an example processor system that may be used to implement the example apparatus and methods described herein.

Inside the portable electronic device 102, shown in FIG. 1, includes a microprocessor with functions that include decoding and performing simple calculations (i.e. adding, subtracting, multiplying and dividing). The processor. FIG. 5 is a block diagram of an example processor system 500 that may be used to implement the example apparatus and methods described herein. As shown in FIG. 5, the processor system 500 includes a processor 502 that is coupled to an interconnection bus 504. The processor 502 includes a register set or register space 506, which is depicted in FIG. 5 as being entirely on-chip, but which could alternatively be located entirely or partially off-chip and directly coupled to the processor 502 via dedicated electrical connections and/or via the interconnection bus 504. The processor 502 may be any suitable processor, processing unit or microprocessor. Although not shown in FIG. 5, the system 500 may be a multi-processor system and, thus, may include one or more additional processors that are identical or similar to the processor 502 and that are communicatively coupled to the interconnection bus 504.

The processor 502 of FIG. 5 is coupled to a chipset 508, which includes a memory controller 510 and an input/output (I/O) controller 512. As is well known, a chipset typically provides I/O and memory management functions as well as a plurality of general purpose and/or special purpose registers, timers, etc. that are accessible or used by one or more processors coupled to the chipset 508. The memory controller 510 performs functions that enable the processor 502 (or processors if there are multiple processors) to access a system memory 514 and a mass storage memory 516.

The system memory 514 may include any desired type of volatile and/or non-volatile memory such as, for example, static random access memory (SRAM), dynamic random access memory (DRAM), flash memory, read-only memory (ROM), etc. The mass storage memory 516 may include any desired type of mass storage device including hard disk drives, optical drives, tape storage devices, etc.

The I/O controller 512 performs functions that enable the processor 502 to communicate with peripheral input/output (I/O) devices 518 and 520 and a network interface 522 via an I/O bus 524. The I/O devices 518 and 520 may be any desired type of I/O device such as, for example, a keyboard, a video display or monitor, a mouse, etc. The network interface 522 may be, for example, an Ethernet device, an asynchronous transfer mode (ATM) device, an 802.11 device, a DSL modem, a cable modem, a cellular modem, etc. that enables the processor system 500 to communicate with another processor system.

While the memory controller 510 and the I/O controller 512 are depicted in FIG. 5 as separate functional blocks within the chipset 508, the functions performed by these blocks may be integrated within a single semiconductor circuit or may be implemented using two or more separate integrated circuits.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general purpose. Accordingly, replacement standards and protocols having the same general purpose are equivalents to the standards/protocols mentioned herein, and contemplated by this patent, are intended to be included within the scope of the accompanying claims.

This patent contemplates examples wherein a device is associated with one or more machine readable mediums containing instructions, or receives and executes instructions from a propagated signal so that, for example, when connected to a network environment, the device can send or receive voice, video or data, and communicate over the network using the instructions. Such a device can be implemented by any electronic device that provides voice, video and/or data communication, such as a telephone, a cordless telephone, a mobile phone, a cellular telephone, a Personal Digital Assistant (PDA), a set-top box, a computer, and/or a server.

Additionally, although this patent discloses example software or firmware executed on hardware and/or stored in a memory, it should be noted that such software or firmware is merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods and articles of manufacture, persons of ordinary skill in the art will readily appreciate that the examples are not the only way to implement such methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

The invention claimed is:

1. A method comprising:

processing, by a processor of a portable electronic device, a plurality of received radio frequency waves to determine a location of a first radio frequency identification tagged item of a plurality of radio frequency identification tagged items, where each of the plurality of received radio frequency waves is associated with a different one of the plurality of radio frequency identification tagged items;

receiving, by the processor, product information from a database, wherein the product information is identified to be associated with the first radio frequency identification tagged item;

displaying, by the processor, on a display the first radio frequency identification tagged item along with the product information;

receiving, by the processor, an input to modify the product information associated with the first radio frequency identification tagged item; and transmitting, by the processor, the product information that is modified back to the database.

2. The method of claim 1, wherein the location comprises a distance and a lateral position.

3. The method of claim 2, wherein the location is further determined from a time delay of each of the plurality of received radio frequency waves.

4. The method of claim 2, wherein the location is further determined from an amplitude change of each of the plurality of received radio frequency waves.

5. The method of claim 1, wherein at least one of the plurality of received radio frequency waves is processed to extract an identification number to reference the first radio frequency identification tagged item.

6. The method of claim 1, further comprising:
using a wireless communication channel to facilitate communication between the processor and the database.

7. The method of claim 1, wherein the product information is displayed as a label associated with the first radio frequency identification tagged item.

8. The method of claim 1, wherein the receiving the product information includes receiving an identification number for the first radio frequency identification tagged item.

9. The method of claim 8, wherein the product information further includes a product description.

10. The method of claim 8, wherein the product information further includes an available quantity.

11. The method of claim 8, wherein the product information further includes a manufacturer name.

12. The method of claim 8, wherein the product information further includes a model number.

13. The method of claim 8, wherein the product information further includes a catalog number.

14. The method of claim 8, wherein the product information further includes a price.

15. The method of claim 1, wherein the display comprises a transparent display.

16. The method of claim 15, wherein the transparent display comprises a pair of goggles.

17. The method of claim 15, wherein the transparent display comprises a pair of glasses.

18. A portable electronic device, comprising:
a display;
a processor; and
a computer readable medium storing a plurality of instructions which, when executed by the processor, cause the processor to perform operations, the operations comprising:
processing a plurality of received radio frequency waves to determine a location of a first radio frequency identification tagged item of a plurality of radio frequency identification tagged items, where each of the plurality of received radio frequency waves is associated with a different one of the plurality of radio frequency identification tagged items;
receiving product information from a database, wherein the product information is identified to be associated with the first radio frequency identification tagged item;
displaying on the display the first radio frequency identification tagged item along with the product information;
receiving an input to modify the product information associated with the first radio frequency identification tagged item; and
transmitting the product information that is modified back to the database.

19. The portable electronic device of claim 18, wherein the location comprises a distance and a lateral position.

20. A tangible computer-readable medium storing a plurality of instructions which, when executed by a processor of a portable electronic device, cause the processor to perform operations, the operations comprising:
processing a plurality of received radio frequency waves to determine a location of a first radio frequency identification tagged item of a plurality of radio frequency identification tagged items, where each of the plurality of received radio frequency waves is associated with a different one of the plurality of radio frequency identification tagged items;
receiving product information from a database, wherein the product information is identified to be associated with the first radio frequency identification tagged item;
displaying on a display the first radio frequency identification tagged item along with the product information;
receiving an input to modify the product information associated with the first radio frequency identification tagged item; and
transmitting the product information that is modified back to the database.

* * * * *